United States Patent
Bedford, Jr.

(10) Patent No.: US 10,702,828 B1
(45) Date of Patent: Jul. 7, 2020

(54) ODOR FILTER

(71) Applicant: Benjamin C. Bedford, Jr., Chattanooga, TN (US)

(72) Inventor: Benjamin C. Bedford, Jr., Chattanooga, TN (US)

(*) Notice: Subject to any disclaimer, the term of this patent is extended or adjusted under 35 U.S.C. 154(b) by 220 days.

(21) Appl. No.: 15/248,670

(22) Filed: Aug. 26, 2016

Related U.S. Application Data (60) Provisional application No. 62/209,970, filed on Aug. 26, 2015.

(51) Int. Cl.
| | | |
|---|---|---|
| *B01D 53/82* | (2006.01) | |
| *B01D 53/52* | (2006.01) | |
| *B01D 53/58* | (2006.01) | |
| *B01D 53/68* | (2006.01) | |
| *B01D 53/75* | (2006.01) | |
| *B01D 53/04* | (2006.01) | |

(52) U.S. Cl.
CPC ......... *B01D 53/82* (2013.01); *B01D 53/0407* (2013.01); *B01D 53/52* (2013.01); *B01D 53/58* (2013.01); *B01D 53/68* (2013.01); *B01D 53/75* (2013.01); *B01D 2251/306* (2013.01); *B01D 2251/50* (2013.01); *B01D 2251/512* (2013.01); *B01D 2251/604* (2013.01); *B01D 2253/102* (2013.01); *B01D 2253/104* (2013.01); *B01D 2253/25* (2013.01); *B01D 2257/2045* (2013.01); *B01D 2257/306* (2013.01); *B01D 2257/406* (2013.01); *B01D 2259/128* (2013.01)

(58) Field of Classification Search
CPC ...... B01D 53/82; B01D 3/0407; B01D 53/75; B01D 53/68; B01D 53/58; B01D 53/52
See application file for complete search history.

(56) References Cited

U.S. PATENT DOCUMENTS

| | | | | |
|---|---|---|---|---|
| 4,058,459 A | * | 11/1977 | Griffin | B01D 17/00 210/132 |
| 4,737,173 A | * | 4/1988 | Kudirka | B01D 46/0023 96/131 |
| 5,714,126 A | * | 2/1998 | Frund | A62B 23/02 422/122 |
| 6,224,751 B1 | * | 5/2001 | Hofmann | C02F 1/003 210/85 |
| 7,232,253 B2 | * | 6/2007 | Isbitsky | G01K 3/04 116/206 |
| 7,309,418 B2 | * | 12/2007 | Joyce | C02F 1/003 210/256 |
| 7,358,494 B1 | * | 4/2008 | Gao | G01N 23/227 250/288 |

(Continued)

FOREIGN PATENT DOCUMENTS

| | | | | | |
|---|---|---|---|---|---|
| WO | WO-9310896 A1 | * | 6/1993 | ............. | A62B 23/00 |
| WO | WO-2013090052 A1 | * | 6/2013 | ......... | B01D 53/0415 |

*Primary Examiner* — Regina M Yoo
(74) *Attorney, Agent, or Firm* — Stephen J. Stark; Miller & Martin PLLC (57) ABSTRACT

An odor filter, preferably utilized on vents of human waste containers, provides a multi-stage construction having a variety of media calculated to remove specific gasses with acid and base impregnated filter media as well as potentially regular activated charcoal. The filter construction can be provided with a multi-diameter connection capability, at least one replacement indicator and/or a safety release to assist in at least one of under-pressure and/or overpressure situations.

4 Claims, 9 Drawing Sheets

(56) References Cited

U.S. PATENT DOCUMENTS

| | | | | |
|---|---|---|---|---|
| 7,442,237 B1* | 10/2008 | Gardner | A62B 18/088 | 128/202.22 |
| 8,225,782 B2* | 7/2012 | Rakow | A62B 18/088 | 128/201.25 |
| 8,365,723 B2* | 2/2013 | Poirier | A62B 18/088 | 128/202.22 |
| 8,673,061 B2* | 3/2014 | Cozean | A61K 31/10 | 95/135 |
| 8,715,587 B1* | 5/2014 | Downs | B01D 53/0407 | 422/306 |
| 9,908,076 B2* | 3/2018 | Billingsley | A62B 9/02 | |
| 9,931,592 B2* | 4/2018 | Billingsley | B01D 53/0407 | |
| 9,994,459 B2* | 6/2018 | Kellam | C02F 1/003 | |
| 2002/0125178 A1* | 9/2002 | Smith | B01D 29/114 | 210/90 |
| 2004/0006815 A1* | 1/2004 | Carroll | A62B 17/006 | 2/457 |
| 2005/0042136 A1* | 2/2005 | Marganski | G01N 21/783 | 422/400 |
| 2005/0087072 A1* | 4/2005 | Wodjenski | B01D 53/0446 | 96/108 |
| 2006/0144766 A1* | 7/2006 | Felmeri | A47J 31/605 | 210/94 |
| 2007/0065951 A1* | 3/2007 | Soldatov | B01D 53/30 | 436/174 |
| 2009/0211963 A1* | 8/2009 | Murray | B01D 21/0012 | 210/433.1 |
| 2010/0294272 A1* | 11/2010 | Holmquist-Brown | A62B 18/088 | 128/202.22 |
| 2013/0189166 A1* | 7/2013 | Thomas | G01N 21/783 | 422/401 |
| 2014/0326134 A1* | 11/2014 | Frankel | B01D 53/0415 | 95/25 |
| 2015/0283493 A1* | 10/2015 | Billingsley | B01J 20/28052 | 128/205.29 |
| 2016/0030877 A1* | 2/2016 | Frankel | A62B 9/006 | 95/25 |

* cited by examiner

ODOR FILTER

CLAIM OF PRIORITY

This application claims the benefit of U.S. Provisional Patent Application No. 62/209,970 filed Aug. 26, 2015, which is incorporated by reference herein in its entirety.

FIELD OF THE INVENTION

The present invention relates to an odor filter, such as could be utilized with vents from septic tanks, waste holding tanks or other containers which may retain and/or release unpleasant odors. Other applications may also present themselves where odors are desired to be controlled through filtration.

BACKGROUND OF THE INVENTION

A number of companies sell odor filters for use with boating applications whereby they are advertised to reduce or eliminate odors. Companies currently selling such filters include Sealand Sanigard Granules, Sealand ECO Granules, SeaRus Sales No Stank Granules and Pellets, Big Orange Granules & Pellets, and John Crisler Mod Kit Granules.

These known recreational holding tank vent filter systems have been tested and found to be deficient for removing many types of malodorous odors. Activated charcoal, generally used for this purpose, can vary in performance depending on particle size, impregnation, and concentration with air, humidity and temperature. Standard activated charcoal will often require specific treatment—impregnation, in order to attain a satisfactory degree of efficiency with regard to the removal of various types of pungent odors. However, prior art vent filter manufacturers have apparently not recognized this need.

Many irritants can contribute to pungent odors, e.g. Hydrogen Sulfide, Ammonia and Trimethylamine. These extreme odors are not normally removed by untreated activated charcoal. In fact the Journal of Health Science 47(5) 483-490(2001) reports that Standard 4×1 OR Carbon media is not good at removing Trimethylamine, Ammonia, and only marginal at removing Hydrogen Sulfide.

Current filter types are predominately single or 2-stage filter designs that are insufficient for the task at hand. Current manufacturers appear to have approached the problem from an entirely errant tact, marginally approaching vapor phase adsorption or treating an odor situation as if it were merely a water vapor adsorption issue (using non-impregnated or regular activated charcoal processed for purification of water as in a fish tank). As best the applicant can tell, untreated activated charcoal in granular and/or pellet form has been used by the prior art constructions in either a single stage homogenous supply of untreated activated charcoal in granular form or in a two stage filter with a first stage having a homogenous supply of untreated activated charcoal in granular form and a second stage having a homogenous supply of untreated activated charcoal in pellet form.

None of the prior art constructions appear to adequately address removal of gas vapor through adsorption, but instead appear to focus on removal of malodorous odors as if they were water vapor. Accordingly there is a need for new odor filters and technology in the marketplace.

There is a need for an improved filter for removing odors, particularly odors eliminating from the combination of human waste (feces and urine) which may be stored in a variety of locations, such as but not limited to septic tanks, holding tanks in boats or recreational vehicles, etc.

SUMMARY OF THE INVENTION

Accordingly, it is an object of a presently preferred embodiment of the present invention to provide a filter for removing odors, particularly odors emanating from human waste which may be stored in a variety of locations, such as but not limited to septic tanks, holding tanks in boats or recreational vehicles, etc.

It is also an object of many embodiments of the present invention to provide a filter having treated charcoals directed to removing certain gas vapors in the case of vapor phase adsorption, as opposed to only water vapor.

It is an object of many embodiments of the present invention to employ a multi-stage filter having at least three stages, if not four, five or more, with at least two, if not three stages directed to targeting specific odors.

It is another object of many embodiments of the present invention to provide at least one indicator with the filter to indicate an estimated time of life remaining for the filter.

It is another object of many embodiments of the present invention to provide an omni-directional safety valve system to protect holding tanks in at least one of over pressure and under pressure situations.

It is another object of many embodiments of the present invention to provide a filter housing having integral (built-in) connections configured to receive multiple diameters of connecting tubes, such as from a vent line or other location.

Accordingly, in accordance with presently preferred embodiments of the present invention, at least three stages, preferably five, are provided within a filter housing connected to a container whereby odor is desired to be reduced either in the container (which could be a people space, such as a filter used for treated incoming air) or outside of the container (such as from a vent line from a septic tank, waste holding tank of a boat or recreational vehicle (RV), travel trailer, or other appropriate container.

Each of the stages, whether provided in a mixed form, in parallel and/or series, can have specific purposes other than mere water vapor, or minimal gas vapor removal alone as has been performed in the prior art.

A first, or other stage, is a coconut shell-based granular activated carbon. Other active carbons could be utilized with other embodiments. Coconut shell based material has been selected for many embodiments for its large surface area, high hardness number for minimal granular breakage (such as into dust). Other embodiments may utilize other materials possibly having other characteristics. A high activity level, large pore volume and chemical stability, makes this media preferable for many embodiments for a first or polishing stage (last stage) in a vapor-phase filtration process for odor control of low molecular weight volatile organic compounds/contaminates. Other shapes and constructions of the media may be provided for various embodiments.

A second stage, if utilized, may be a Potassium Hydroxide (KOH) (or other base) impregnated coal-based granular activated carbon. By using a base impregnated charcoal, and more preferably a KOH impregnated charcoal, desulfurization of gases and the removal of many, if not most acidic contaminants such as hydrogen sulfide, hydrogen chloride, methyl mercaptans and general acid types, can be facilitated. This stage could be provided in a variety of locations throughout the filter, if utilized. Other shapes and constructions of the media may be provided for various embodiments.

A third stage may be a round pellet-activated alumina, possibly impregnated with some, if not eight percent (8%) Potassium Permanganate (KMnO4) (another base) which may be particularly well suited to the removal of at least some Hydrogen Sulfide (H2S) and/or sulfur dioxide (SO2) when venting contaminates from the air flow. This media is excellent for applications where activated carbon is ineffective like the adsorption and/or oxidation of polar or lower molecular weight compounds. Other shapes and constructions of the media may be provided for various embodiments.

This activated alumina, if utilized, may be internally honeycombed with tiny channels that branch and twist throughout to provide massive, chemically active surface area per weight. These intricate channels are believed to extensively increase the chemical surface areas to assist in the destruction of corrosives and contaminates and odors not eliminated by standard activated carbon media. Among the gases and vapors which may be eliminated are: H2S, SO2, SO3, Ethylene (Olefins), Formaldehyde, Methyl/Ethyl Mercaptans, Chlorine, HCl, Short-chained Alcohols, Aldehydes, Light Organic Vapors, Organic Acids, Inorganic Acids, and/or to a lesser degree, Aromatics, Long-chained Alcohols, Ketones, Chlorinated Hydrocarbons, Paraffins, Heavy Organic Vapors and/or Heavy Mercaptans.

Stage four, if utilized, may a cylindrical pellet coal-based activated carbon, specifically infused with Phosphoric Acid (H3PO2) which is believed to assist in the removal of Ammonia (NH3), Amines (i.e. Trimethylamine and contaminates), and/or other bases. The odor of Ammonia has been found to greatly to the offensive odor of human waste. Additionally, while the odor-threshold concentration of Trimethylamine is 1/1000 or less than that of Ammonia, its contribution to the smell of urine can be stronger than that of ammonia. Standard activated charcoal, in its base form, has been traditionally found to be ineffective at removing these malodorous odors. Other shapes and constructions of the media may be provided for various embodiments.

Stage five, if utilized, may be the same as stage one, or it could be a cylindrical pellet coal-based virgin activated carbon media adsorbent, with well-developed macro-pore and micro-pore structure that can provide a wider uniformity in pellet size. This media can be excellent for use as either a first or polishing stage component. This media can also be an ideal agent for cleaning or eliminating volatile organic compounds that are in the air as a result of combining feces and urine within a holding tank or reservoir. Again, this media normally provides a high hardness number for minimal breakage, reducing the potential for small particles and fines/dust that tend to cause more rapid degradation of less hard active carbons and leading to early filter blockage/breakdown. Other shapes, constitutions and/or constructions of the media may be provided for various embodiments.

While some embodiments employ all five stages serially in a filter housing in the order described above, other embodiments may utilize only some stages or even additional stages, mix at least some of the filter media together, and/or provide an indicator, if not provided with one of the stages, such as with alumina as described below, or otherwise.

A single filter housing is preferably constructed to cooperate with a plurality of inlet and outlet diameters such as could be provided from flexible tubing, like vent line tubing is normally provided, or from conduit or other materials. A presently preferred embodiment has been constructed to accommodate ⅝ inch, inch, 1 inch, and 1½ inch diameter vent tubing. Other embodiments may accommodate additional and/or other diameters. Many embodiments envision having the connections on end caps at either or both ends of a section of tubing with the tubing retaining the filter stages and/or other material therein.

At least one safety valve is preferably provided with at least some presently preferred embodiments. For many embodiments, the safety valve feature can be an omni-directional valve(s) so that the direction of installation of the filter relative to a holding container is not particularly important as it relates to operation of the safety valve. By providing omni-directional safety valve capability, the filter system of presently preferred embodiments can drastically reduce the likelihood of holding tank damage (often implosion) due to pressure situations created when pumping the tank which could occur from having a clogged filter or other restriction in the vent line or cylinder to outside air. Some embodiments may incorporate safety valves into end caps of the housing, and still other embodiments may use the same cap construction for both ends for ease of manufacturing and/or simplicity in installing the filter.

A color changing indicator, if not a stage, or other indicator can also be provided to be viewed at least once at the housing and remotely whereby the indicator may provide either a direct or indirect indication of at least one of remaining life or installed time. Some embodiments may provide a time indicator, such as one made by Timestrip™ or other company. Some embodiments may provide a color changing filter media as a stage and/or as an indicator which may be viewed at least through a window through the housing which can provide an indication of the remaining life of at least that stage, the passage of time, or other indication related to the life of the filter system.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENTS

Figure 1:
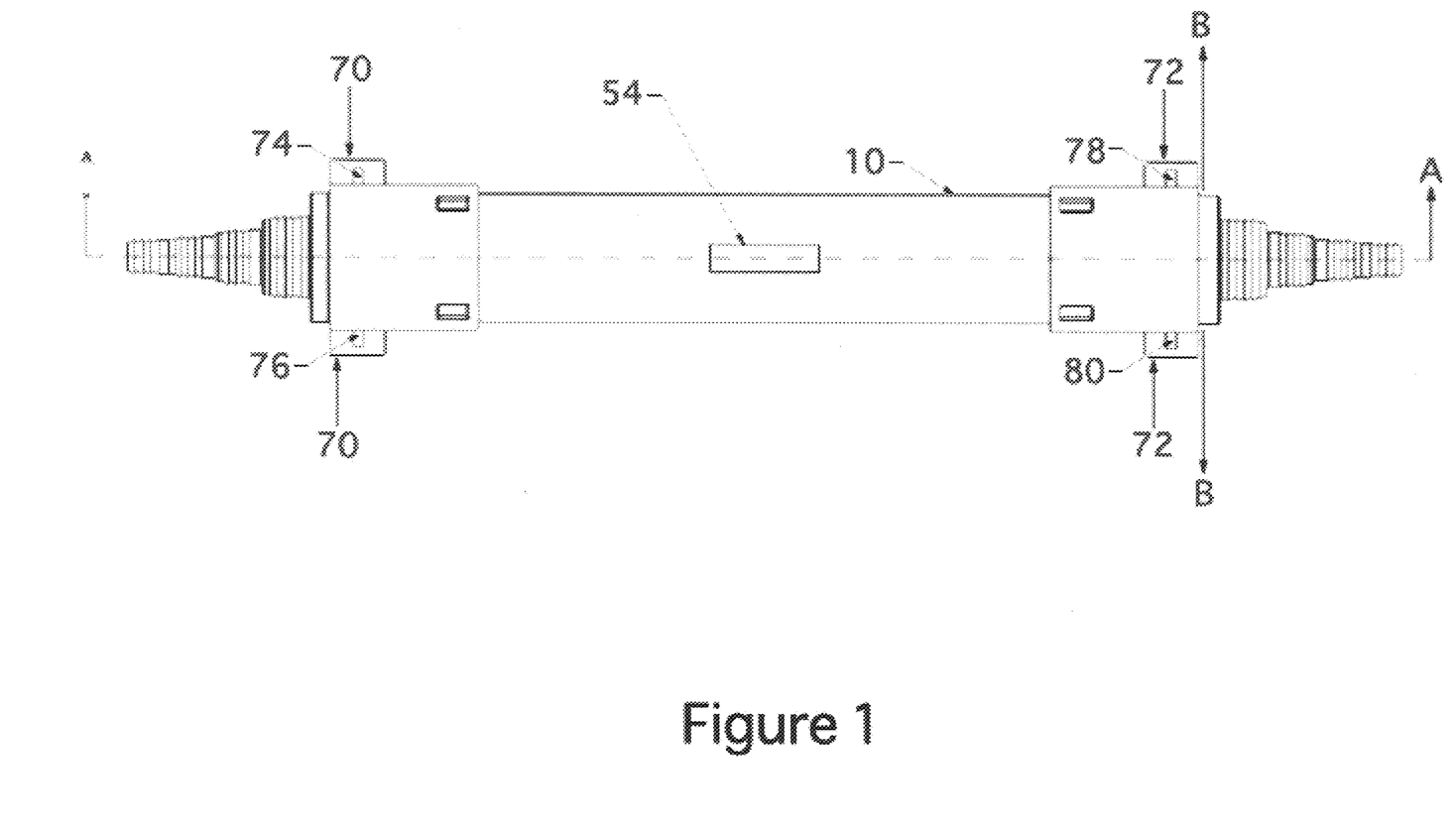
FIG. 1 is a side plan view of a presently preferred embodiment of the present invention.
Figure 7:
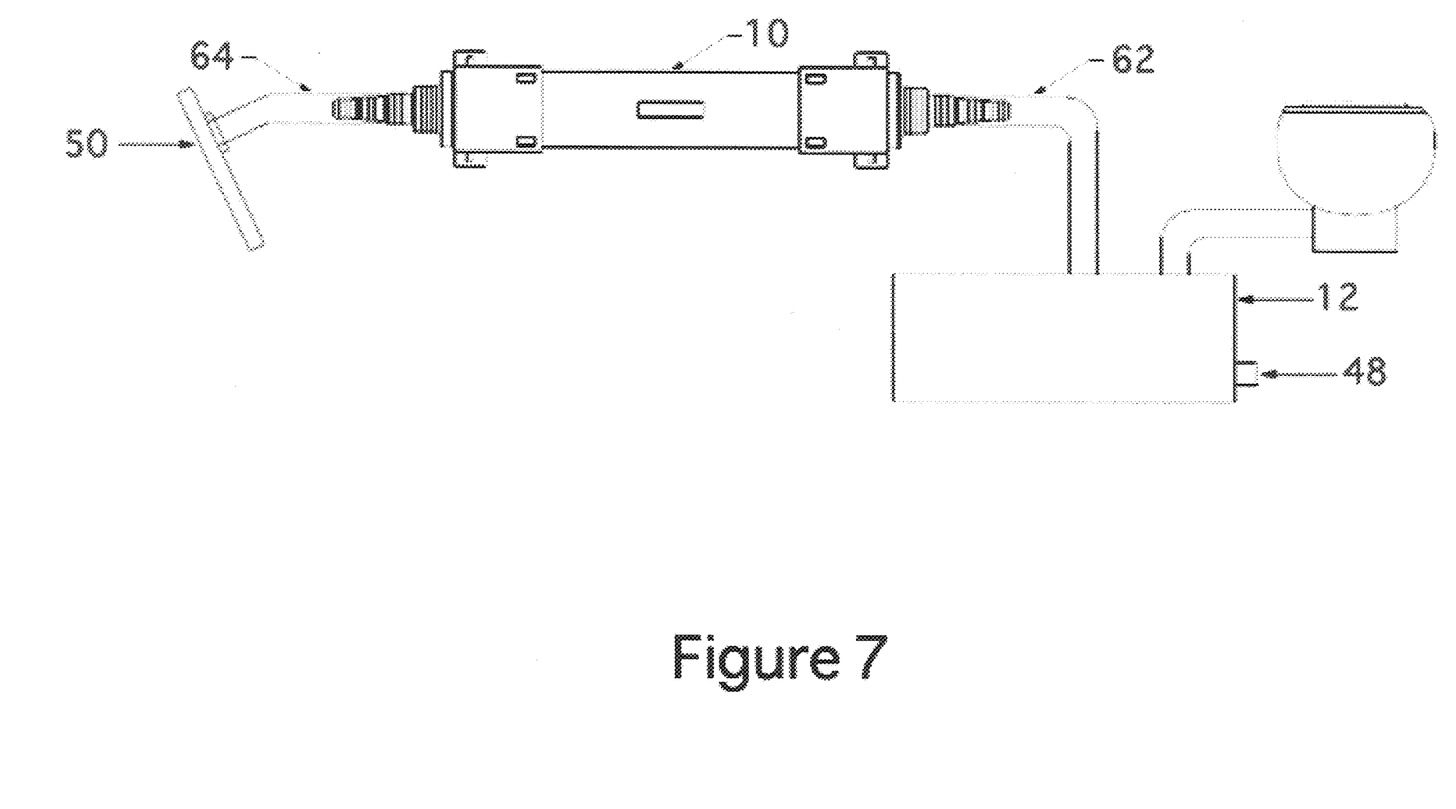
FIG. 7 is a schematic view showing the filter connecting to a container filtering odor from the container.

FIG. 1 is an assembled side plan view of a filter 10 illustrated as a vent filter ready to eliminate unpleasant odors resulting from the combination of feces and urine in recreational vehicle holding tanks 12 as shown in FIG. 7. Other tanks 12 could be at issue with other embodiments whether they retain human waste or not. The filter 10 of the presently preferred embodiment not only accomplishes this, but the filter 10 also preferably traps and removes at least some of the undesirable byproducts from organic particulates heretofore not eliminated by standard activated charcoal media (i.e., possibly organic sulfurs and amines) and at the same time potentially allow harmless non-malodorous gas vapors and/or carbon dioxide to return to the atmosphere.

Figure 2:
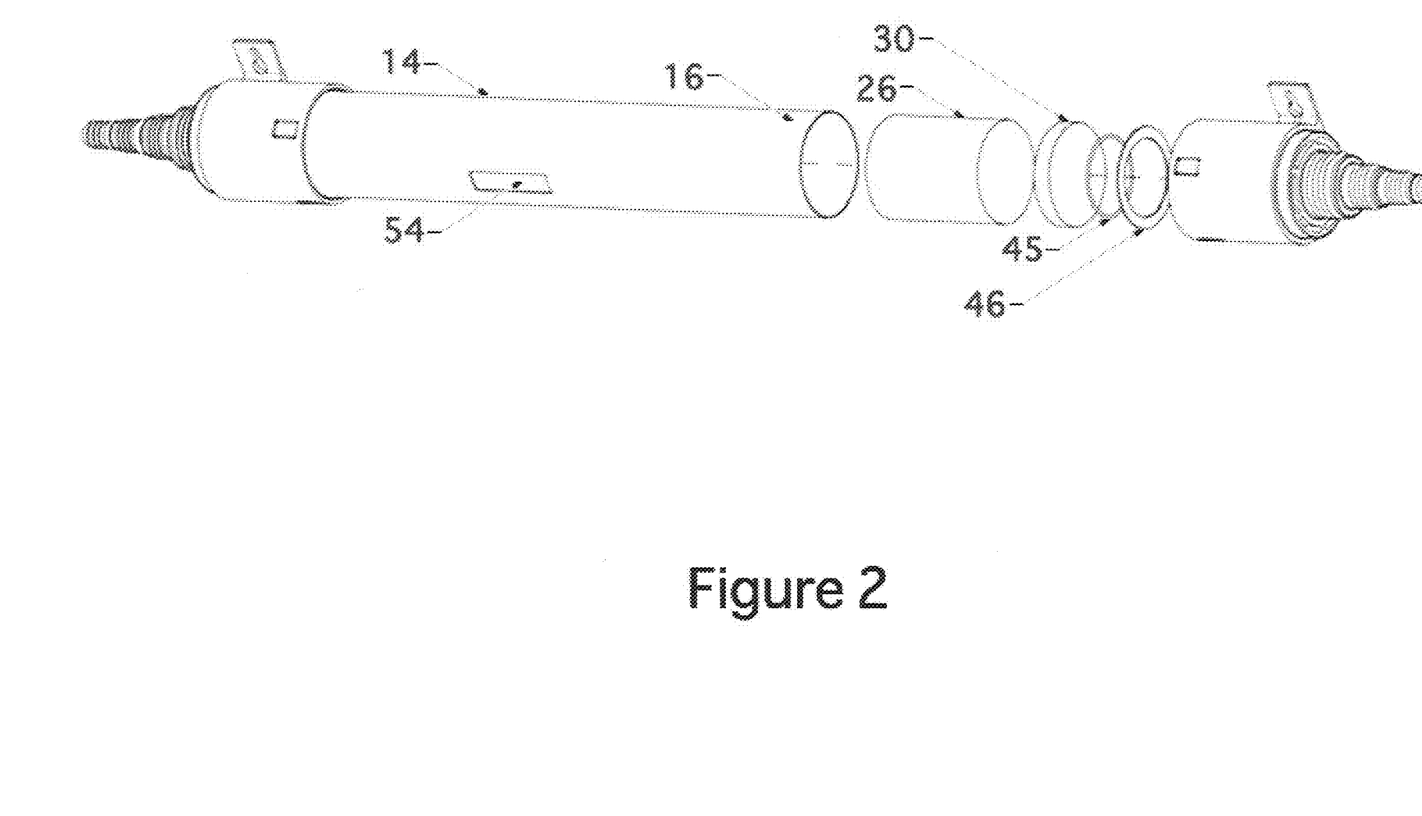
FIG. 2 is an exploded view of the embodiment shown in FIG. 1.
Figure 3A:
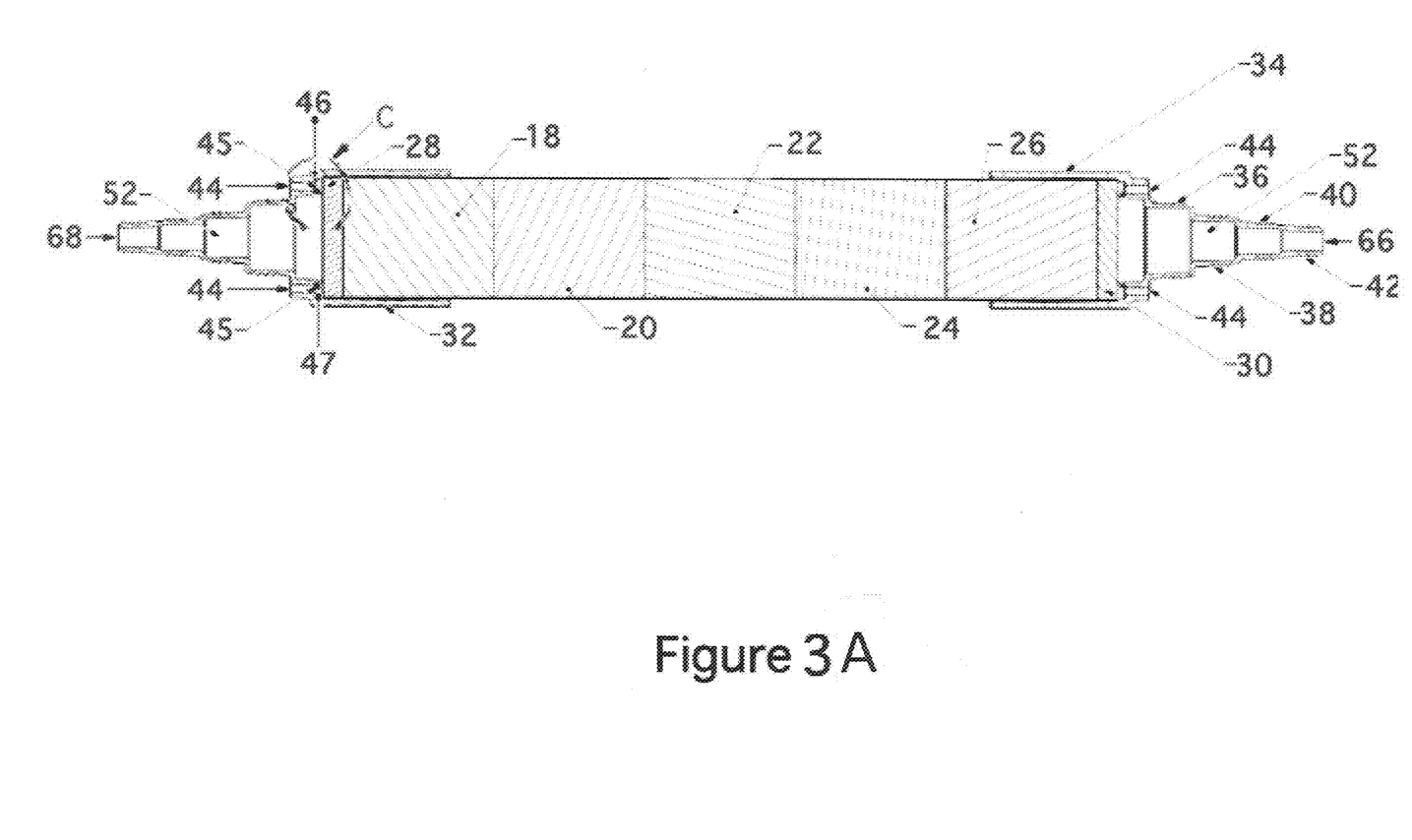
FIG. 3A is a schematic/cross sectional view taken along the line A-A of FIG. 1.
Figure 3B:
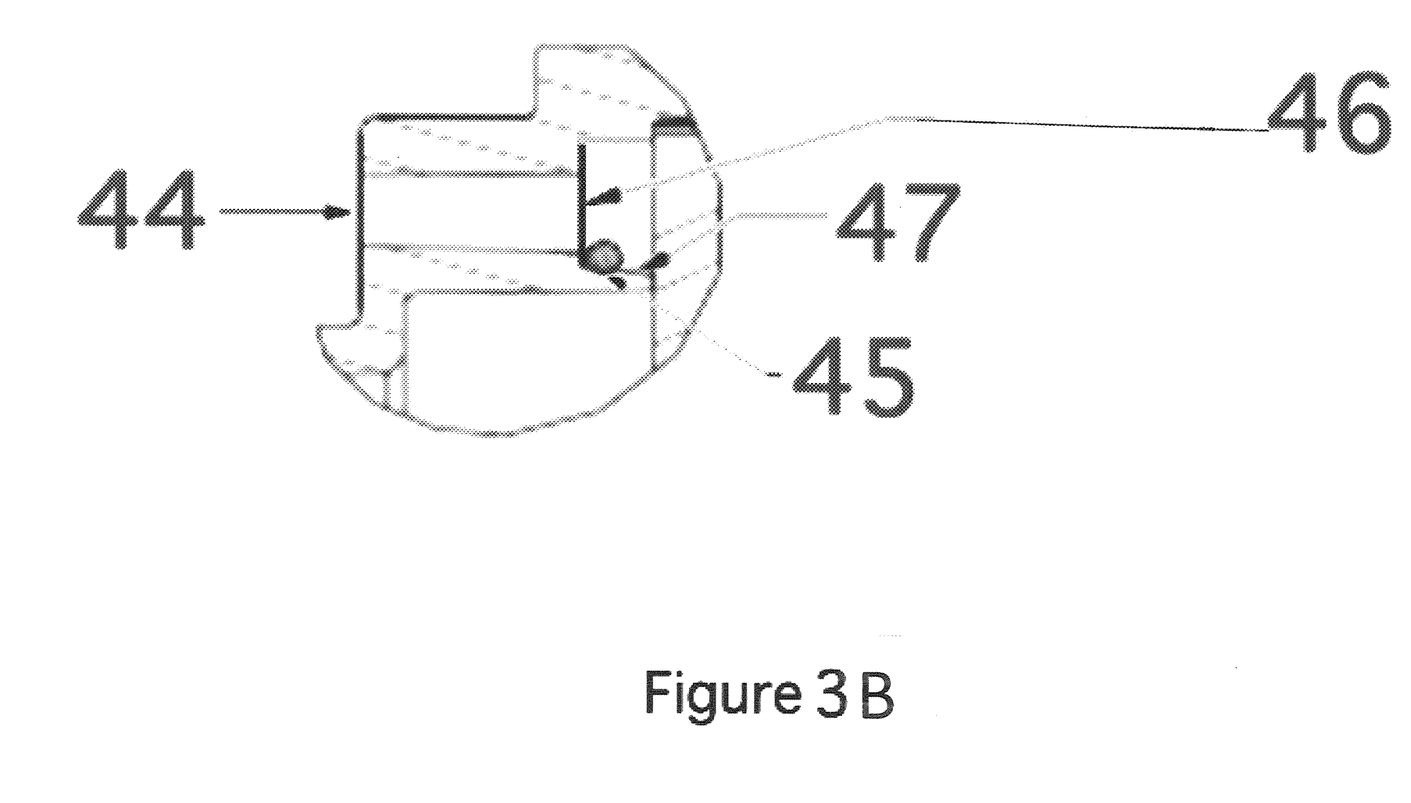
FIG. 3B is a cross sectional view showing detail C of FIG. 3A.

FIG. 2 shows an exploded side view of the filter 10 depicting internal parts as well as a housing 14 utilized in a presently preferred embodiment. Housing 14 may include (although not all embodiments need be round), at least some of the five stages of media components 18,20,22,24,26 illustrated in FIGS. 2 and 3, foam retainers 28,30, and end-caps 32,34 along with a user choice of barbed vent line connectors 36,38,40,42. Retainers 28,30, if utilized, may assist in retaining media 18,20,22,24,26 in cylinder 16 for at least some embodiments while permitting air flow therethrough.

Also visible are relief valves in the housing 14 which can include holes or passages 44 in the end-caps 32,34, which can assist in alleviating at least one of an overpressure/under-pressure situations which might otherwise be harmful to container or other structure. Rings 46 are useful to cooperate with passages 44 to at least assist in providing a pressure relief valve at end caps 32,34 as will be explained in further detail below. However, briefly, if an under-pressure situation is created in container, such as by pumping it through port 48 possibly with a clogged filter 12 or vent outlet 50, the ring 46 is pulled toward the appropriate one of foam retainers 28,30 to permit air flow through the passages 44 and then through bore 52 so that the tank 12 or container is not crushed due to a negative pressure situation. O-ring 45 may assist in retaining ring 46 in a desired position until a relief situation occurs. O-ring may be retained against lip 47. Lip 47 may, for at least some embodiments, space retainers 28,30 from ring 46. Having an underpressure situation crush a tank 12 can be a very expensive problem to correct on a boat or other location where the tank 12 is not easily replaced. Unfortunately, some boat owners will allow the tank 12 to fill up into prior art filters to clog them, and then pump which can result in a clogged filter and then a failed tank 12 due to the underpressure situation created when pumping contents from the tank. The relief valve nature of the end cap 32 or 34 is a marked improvement over the prior art, particularly as an omni-directional relief (it makes no difference which direction some embodiments are installed to still provide the relief feature in the event of an under-pressure event in the tank 12). Some embodiments provide a relief valve, an end cap relief valve as described herein, and/or still other embodiments may use some, or all of the teaching herein, regarding this feature.

FIG. 2 also shows an indicator in a form of a window 54 on the housing 14 which can provide an ability to view an indicator mechanism, in this case stage three, or media 22, which can be an alumina or other material which changes color from when it is first provided (a ready state or condition) until it is no longer effectively removing gas vapor it is known to adsorb (an exhausted state or condition). Some media may provide an indicator 54 possibly without contributing to odor removal at all, and/or partially.

Figure 8A:
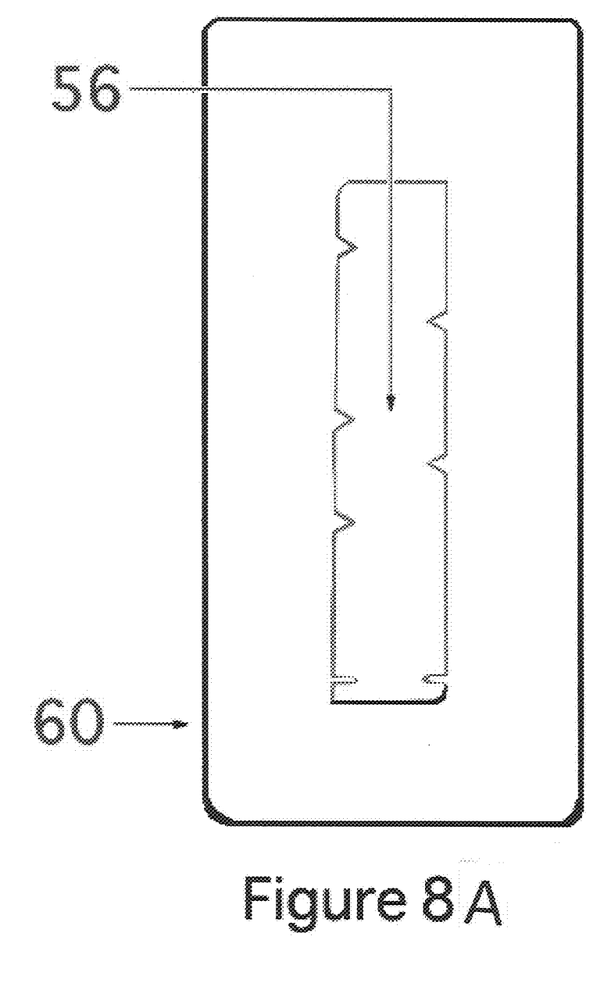
FIGS. 8A and 8B are front and back plan views of an alternatively preferred indicator used with at least some embodiments.
Figure 8B:
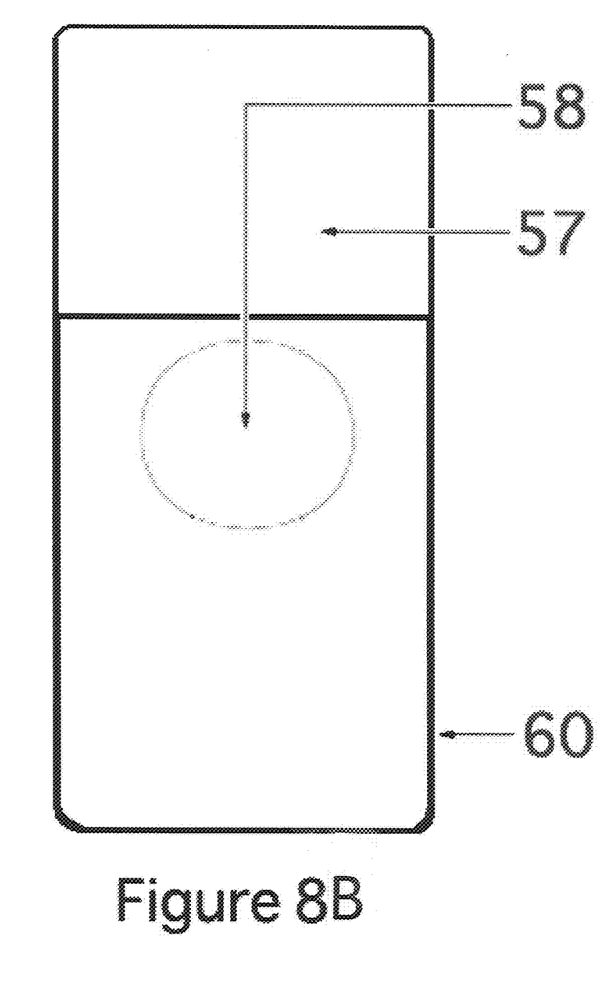

Another indicator 56 illustrated in FIGS. 8a and 8b is a Timestrip™ which is a device sold in the market which, when activated, provides a visual representation of the expiration of a specific amount of time. For the illustrated embodiment, the filter 10 is calculated to have a life of at least one year and the indicator 56 can show the passing of that year when activated, such as by pressing button 58 on the rear of display 60. Indicator 56 may or may not be connected to the housing 14 as illustrated, but instead, might be remotely positioned, such as at a control area of a boat, near a toilet, or another area which might be easier to view than where the filter 10 is physically located when installed. Display 60 may change as time passes to correspond to time elapsed such as could be done chemically, electrically or otherwise with a timer, such as changing colors with a rising bar graph to be completely changed in color at a pre-determined time.

FIGS. 3a and 3b show a cross section of the filter 10 showing a five stage embodiment in a series construction with five distinct stages of media components 18,20,22,24, 26. Other embodiments may have other constructions, as will be described in detail below. Many, if not all of the stages, are selected to, for many embodiments, at least assist in providing an ability to adsorb specific odors and/or contaminates passing from the holding tank 12 into the filter 10 and/or provide an indicator 54 relative to life of the filter 10.

Figure 4:
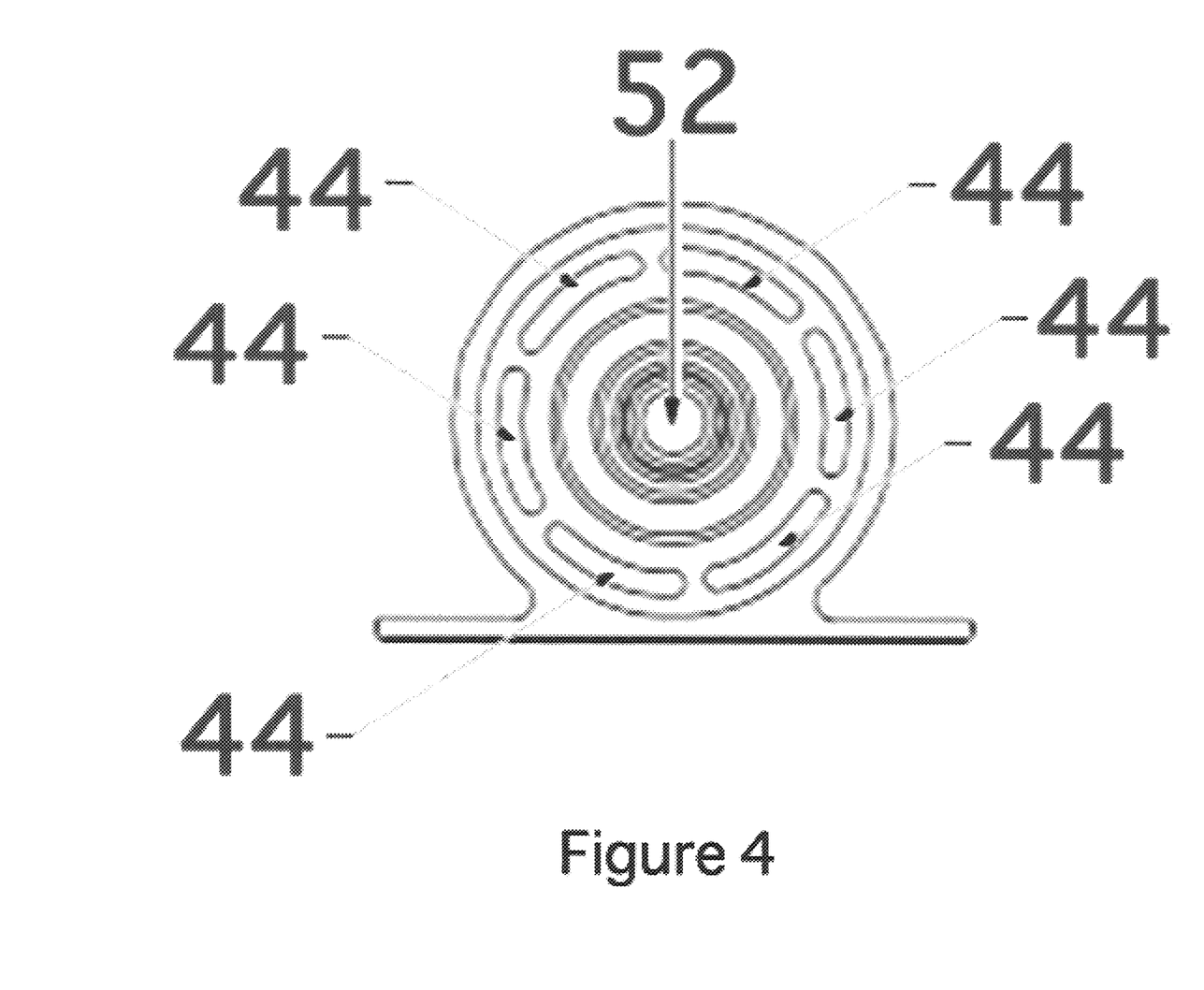
FIG. 4 is a cross sectional view taken along the line B-B of FIG. 1.

FIG. 4 shows an internal cross sectional view of an end cap 32 or 34 with the passages 44, preferably disposed circumferentially and radially outwardly of bore 52. Ring 46 as shown better in FIG. 3b, normally prevents flow from bore 52 through passages 44 until one of an underpressure and/or overpressure situation occurs (under-pressure is illustrated) and described above, the ring 46 could be engineered to buckle in the event of an overpressure situation to permit the escape of air from housing 14 through passages 44 in an over-pressure situation as well.

Figure 5:
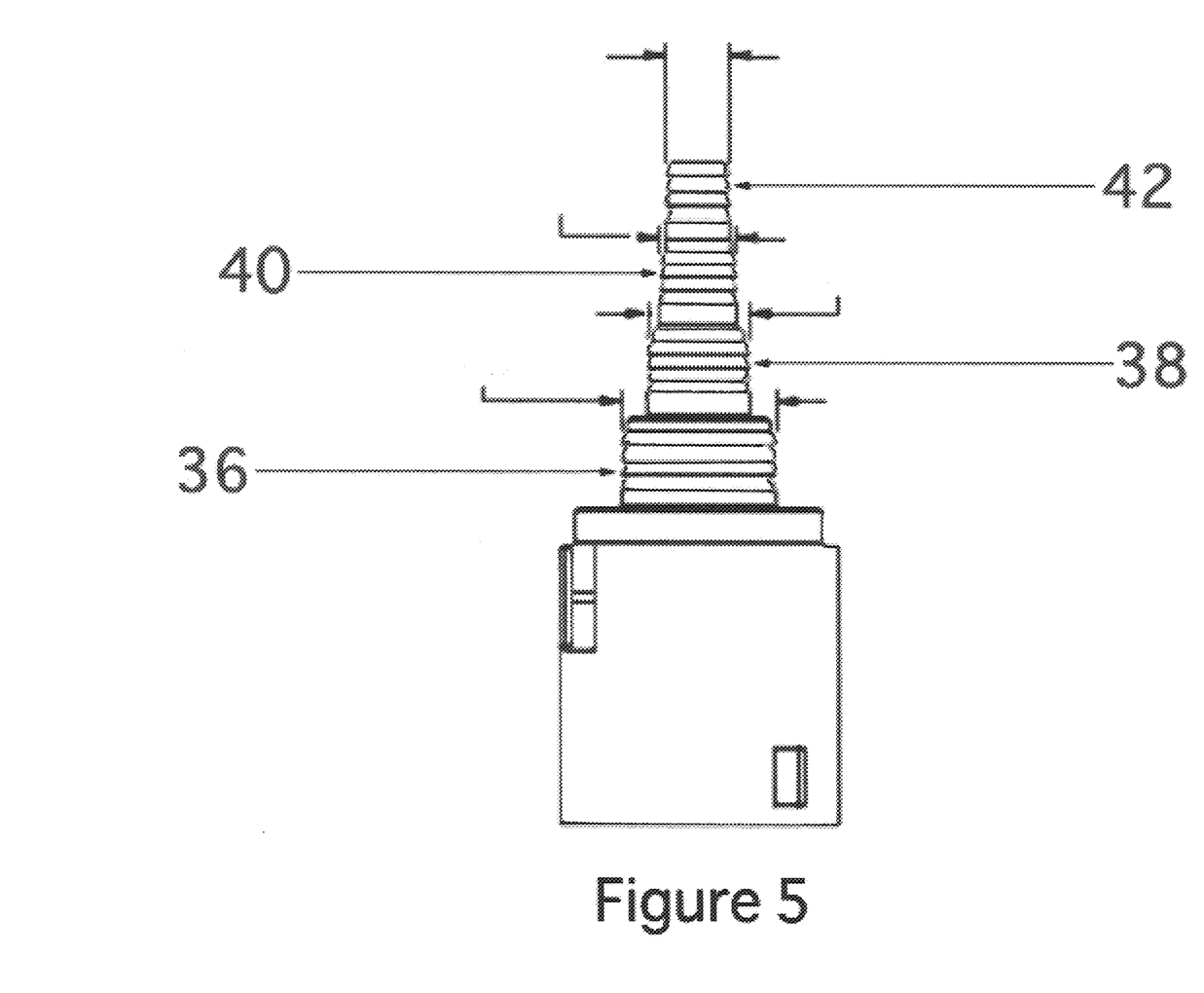
FIG. 5 is a side plan view of an end cap as shown in FIGS. 1-5.

FIG. 5 is a side plan view showing the end cap 32 or 34 with the various connection locations 36,38,40,42 for various diameter tubing 62,64 directed into inlet and outlet 68,66 of filter 10, which for the illustrated embodiment and/or others could be omni-directional in nature. Connection locations 36,38,40,42 could accommodate ⅝ inch, ¾ inch, 1 inch, and 1½ inch diameter vent tubing. Other embodiments may accommodate additional and/or other diameters. Many embodiments envision having the connections 36,38,40,42 on end caps 32,34 at either or both ends of a section of cylinder 16 with the cylinder 16 at least assisting in retaining the filter stages and/or other material therein. Filters 10 can be air tight for many embodiments from inlet 68 to outlet 66, except that the relief valve, if utilized, is activated.

Figure 6:
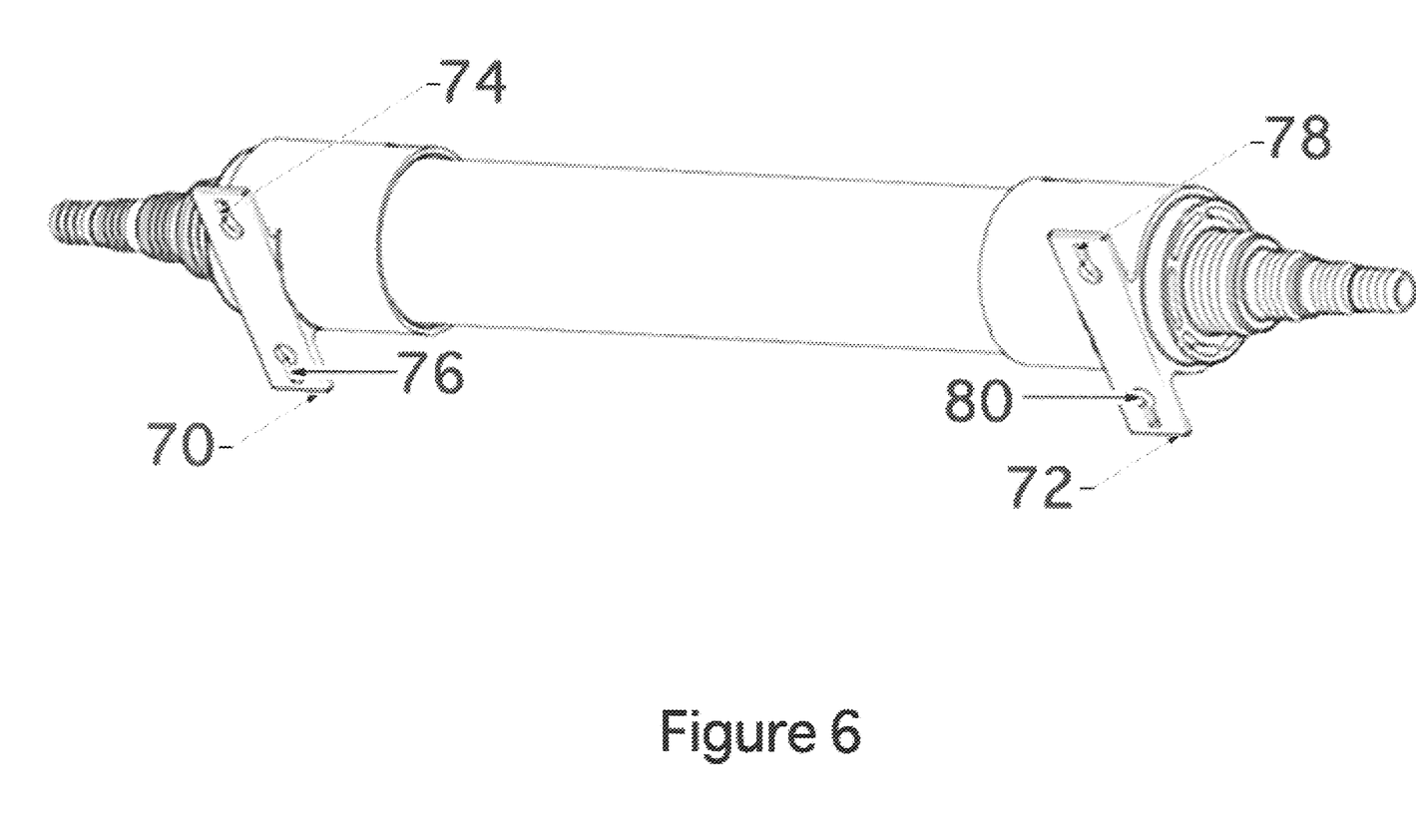
FIG. 6 is a perspective view of the end cap shown in FIG. 6.

Other embodiments may provide for connection locations 36,38,40,42 to be swapped out, broken off, or otherwise movable relative to end cap 32,34 and/or cylinder 16. FIG. 6 is also helpful to understand the construction of the end caps 32,34.

This filter 10 can be provided as a single package apparatus that provides a "One-Filter-Fits-All Line Sizes" capability. The filter 10 components include: appropriate mounting hardware such as feet 70,72 which can be provided with bores 74,76,78,80 to allow one to easily connect the filter 10 to a planar or other surface, such as a wall. Two end-caps 32,34 can be provided which may have up to or even more than four selectable barbed adapters or connectors 36,38, 40,42, i.e., an adapter for each of four vent filter line sizes (⅝", ¾", 1" & 1.5", and/or other appropriate sizing) along with a tube, canister or cylinder 16 which may contain the stages of media. Connectors 36,38,40,42 could be removable or otherwise replaced with other embodiments.

Also provided are foam retainers 28,30 to retain the media in place in the canister or cylinder 16 along with O-ring 45 and/or rings 46 which can assist in providing the overpressure/under-pressure safety or relief valve(s) Other relief valve constructions can be provided with other embodiments, but by having the relief valve between tubing portions 62,64, along, if not integral to the filter 10 has been found to be desirable for many embodiments. Furthermore, having omni-directionality for filter 10, allows for the safety relief feature to be in place regardless of the direction of orientation that the filter is connected relative to the tubing portions 62,64, even if any of the filter media 18,20,22,24,26 is clogged.

For many tanks 12, a host of odors may emanate other than just water vapor. Having a filter capable of removing a variety of noxious odors, particularly those emanating from the mixture of feces and urine in marine or recreational vehicle holding tanks 12, is desirable for many embodiments. Each of the media types and/or stages can be selected for a specific task and its cleansing specificity. The filter 10 may readily be installed to tubing 62,64 and/or mounted to a structure, such as a wall, as would be understood by those of ordinary skill in the art.

An indicator may be viewed through window 54 to advise of the life of at least a stage of the filter 10. For the preferred embodiment, stage 3, or the alumina media 22 is magenta when new and then turns to brown/bronze then to yellow/gold and then to white/grey when expired. Indicator 56 can show an expired situation based on time on the display 60 as well or in addition thereto. Indicator 56 may also have adhesive 57, or other connector, on a back side (shown in FIG. 8*b*) which can assist in either having indicator 56 be connected to a filter 10 or a remote location so that a user need not necessarily access the area where the filter 10 is located (likely under a portion of a boat or an out of the way area) to know to replace the filter 10. Holding tank filters of the prior art have been overloaded with plugged-up filter media. This too often results in serious damage to the associated vehicle's holding tank (implosion) when a vacuum is applied to empty the tank. Here the omni-directional safety valve system prevents the possibility of damage should the filter become clogged. The filter 10 of the preferred embodiment works no matter the orientation of filter installation, although other embodiments could be made to be unidirectional.

The filter 10 can be a multi-stage filtering apparatus where each stage selected (described below) can perform a specific function in the odor removal process. Many of these odors are extremely unpleasant and are too often not removed by other filter designs. Current filter market systems are marginal at best, particularly in regard to actually removing the most repulsive of these odors that result from the chemical reactions caused by the combining of feces and urine in marine and recreational vehicle holding tanks 12. Other tanks 12 may have these or other odors to or from which removal of odors is desirable.

The filter 10 of the presently preferred embodiment far exceeds the capability of current vent filter systems known by the applicant to be available to the marketplace. This is especially true with regard to trapping specific types of the undesirable odorous byproducts from organic particulates (Fatty Acids, Organic Sulfurs and Organic-Amines and other molecules whose pungent odors result from the decomposition of Hydro-Carbons in the excreta for which regular activated charcoal is well known not to adsorb). The filter 10 can also permit the release of harmless non-malodorous gas vapors and/or carbon dioxide to reenter the atmosphere.

Each of any of the stages 18,20,22,24,26, whether provided in a mixed form, in parallel and/or series, can have specific purposes other than mere water vapor removal alone as has been performed in the prior art.

A first, or other, stage 18 is a coconut shell-based granular activated carbon. Other active carbons could be utilized with other embodiments. Coconut shell based material has been selected for many embodiments for its large surface area, high hardness number for minimal granular breakage (such as into dust). Other embodiments may utilize other materials, such as coal or other material, possibly having other characteristics. A high activity level, large pore volume and chemical stability, makes this media preferable for many embodiments for a first or polishing stage (last stage) in a vapor-phase filtration process for odor control of low molecular weight volatile organic compounds/contaminates.

A second stage 20, if utilized, may be a Potassium Hydroxide (KOH) (or other base) impregnated coal-based granular activated carbon. Other embodiments may use other materials. By using a base impregnated charcoal, and more preferably a KOH impregnated charcoal, desulfurization of gases and the removal of many, if not most acidic contaminants such as hydrogen sulfide, hydrogen chloride, methyl mercaptans and general acid types, can be facilitated. This stage could be provided in a variety of locations throughout the filter, if utilized. Other shapes, constitutions and/or constructions of the media may be provided for various embodiments.

A third stage 22 may be a round pellet-activated alumina, possibly impregnated with some, if not eight percent (8%) Potassium Permanganate (KMnO4) (another base) which may be particularly well suited to the removal of at least some Hydrogen Sulfide (H2S) and/or sulfur dioxide (SO2) when venting contaminates from the air flow. This media is excellent for applications where traditional activated carbon is ineffective like the adsorption and/or oxidation of polar or lower molecular weight compounds. Other shapes, constitutions and/or constructions of the media may be provided for various embodiments.

This activated alumina, if utilized, may be internally honeycombed with tiny channels that branch and twist throughout to provide massive, chemically active surface area per weight. These intricate channels are believed to extensively increase the chemical surface areas to assist in the destruction of corrosives and contaminates and odors not eliminated by standard activated carbon media. Among the gases and vapors which may be eliminated are: H2S, SO2, SO3, Ethylene (Olefins), Formaldehyde, Methyl/Ethyl Mercaptans, Chlorine, HCl, Short-chained Alcohols, Aldehydes, Light Organic Vapors, Organic Acids, Inorganic Acids, and/or to a lesser degree, Aromatics, Long-chained Alcohols, Ketones, Chlorinated Hydrocarbons, Paraffins, Heavy Organic Vapors and/or Heavy Mercaptans.

A single filter housing 14 is preferably constructed to cooperate with a plurality of inlet and outlet diameters such as could be provided from flexible tubing, like vent line tubing is normally provided, or from conduit or other materials. A presently preferred embodiment has been constructed to accommodate ⅝ inch, ¾ inch, 1 inch, and 1½ inch diameter vent tubing. Other embodiments may accommodate additional and/or other diameters. Many embodiments envision having the connections 36,38,40,42 on end caps 32,34 at either or both ends of a section of cylinder 16 with the cylinder surrounding the filter stages 18,20,22,24 and/or 26, and/or other material therein.

A fourth stage 24, if utilized, may be a cylindrical pellet coal-based activated carbon, specifically infused with Phosphoric Acid (H3PO2) which is believed to assist in the removal of Ammonia (NH3), Amines (i.e. Trimethylamine and contaminates), and/or other bases. The odor of Ammonia has been found to be an offensive odor of human waste. Additionally, while the odor-threshold concentration of Trimethylamine is 1/1000 or less than that of Ammonia, its contribution to the smell of urine can be stronger than that of ammonia. Standard activated charcoal, in its base form, has been traditionally found to be ineffective at removing these malodorous odors. Other shapes, constitutions and/or constructions of the media may be provided for various embodiments. Other acids may be used to treat the activated carbon to provide for odor treatment as well, possibly with similar results.

A fifth stage 26, if utilized, may be similar to, if not the same as the first stage 18 which is described in detail above. Still other embodiments may utilize a cylindrical pellet coal-based virgin activated carbon media adsorbent, with well-developed macro-pore and micro-pore structure that can provide a wider uniformity in pellet size. This media can be excellent for use as either a first or polishing stage component. This media can also be an ideal agent for cleaning or eliminating volatile organic compounds that are in the air as a result of combining feces and urine within a holding tank 12 or reservoir. Again, this media normally provides a high hardness number for minimal breakage, reducing the potential for small particles and fines/dust that tend to cause more rapid degradation of less hard active carbons and leading to early filter blockage/breakdown. Other shapes, constitutions and/or constructions of the media may be provided for various embodiments.

While some embodiments employ all five stages 18,20, 22,24,26 serially in a filter housing 14 in the order described above, other embodiments may utilize only some stages 18,20,22,24 and/or 26 or even additional stages, mix at least some of the filter media together, and/or provide an indicator 56, if not provided with one of the stages, such as with alumina as described below, or otherwise.

No known vent filter 10 is known to utilize either or both acid and base treated activated charcoal in an effort to specifically remove specific gas vapors. Accordingly the applicant claims at least a two stage filter 10 having at least a stage having an acid treated activated charcoal, such as one treated with Phosphoric Acid (H3PO2). The applicant further claims at least a two stage filter 10 having at least one stage having a base treated activated charcoal such as one treated with Potassium Hydroxide (KOH). The applicant further claims at least a two stage filter 10 having at least one stage with alumina, possibly base infused alumina such as one impregnated with Potassium Permanganate (KMnO4). The applicant further claims at least a two stage filter having at least a base impregnated media (whether alumina or charcoal) and an acid impregnated charcoal.

The applicant further claims at least a three or four stage filter having a base impregnated media (whether alumina or activated charcoal, or both), an acid impregnated media, and a regular (non acid or base impregnated) activated charcoal. Using the regular activated charcoal as a first and final stage also has been found to be helpful for many embodiments, possibly selected with different pore structures as has been done with the preferred embodiment. While the five illustrated stages 18,20,22,24,26 are provided in series in the canister or cylinder 16, other embodiments could mix some of the claimed stages together and/or have different numbers of stages 18,20,22,24 and/or 26, possibly with at least some containing different media.

The applicant discovered a test online of prior art untreated activated charcoal filter performance. SaniGard™ made by SeaLand was found by Intertek Group, Chicago, Ill. to outlast competitive filters by factors of 2.4 to 12.6 times longer based on calculated capacity in grams of carbon disulfide removed by adsorption. Accordingly, the applicant could then compare results of the technology disclosed herein to the promoted best of the prior art designs. In providing a test against this prior art device, a media adsorption efficiency test was conducted with the various competitors including the filter 10.

Through an independently provided testing entity and using a media weight of 257.8 grams the applicant discovered that a 32% greater media capacity in the filter 10 resulted in a 69% increase in performance for an initial twenty-four week test. In a second and third subsequent test, the filter 10 continued adsorbing throughout the test going from 147 grams in the first twenty-four weeks, 238.6 after the second 24 weeks, and 560.5 grams adsorbed by the end of the testing. The best performing alternative stopped adsorbing within ten months of the test commencing at 238 grams which was virtually the same (239 grams) at the end of the thirteen month test period.

In a second testing session of twenty-two weeks, the filter 10 adsorbed 223.3 grams. No Stank adsorbed 94.6 grams, ECO adsorbed 82.2 grams and the others did not fare as well.

A flow rate efficiency evaluation was also conducted with the preferred embodiment versus Sanigaurd, Sealand Eco, No Stank, Big Orange and John Crisler designs. In every test, the applicant's preferred embodiment was exponentially closer to a no load condition than any of the prior art. Sealand Eco was the closest, but had over 0.5 inches of water change with 6 liters of gas flow per minute as compared to about 0.4 for the filter 10 of the preferred embodiment. At 9 liters per minute flow, the filter 10 barley had 0.5 inches of water change (on a linear trajectory, like the no-load condition) and was within 10% of the no load condition, while Sealand Eco was now in excess of 0.7 inches of water change on a linear trajectory.

The amount of material in the stages 18,20,22,24,26 can be as desired by the manufacturer and/or as specified by a party. The applicant is initially contemplating 79.4 grams of the first stage 18, 96.6 grams of the second stage 20, 144.2 grams of the third stage 22, 114.9 grams of the fourth stage 24, and 79.4 grams of the fifth stage 26. Each of these amounts represents common volumes of roughly two and a half inches of a 2.375 inner diameter housing 14 and/or cylinder 16. However, as weights are shown varying, volumes could vary amongst the stages 18,20,22,24,26 in various embodiments as well. It is anticipated that each of the stages 18,20,22,24,26 would have a flow distance in a cylinder 16 and/or housing 14 of at least about ½ an inch, if not at least 1 inch up to about five inches as well as a weight of at least about 50 grams or more for many embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A filter comprising:
   a housing having a canister, a first end cap at an end of the housing having an inlet therethrough the first end cap, and an outlet, said housing connectable to a tank in an installed configuration with the tank having feces and urine therein; and at least two different stages of particulate media located in the canister, a first stage impregnated with a base removing at least some odors selected from the group of hydrogen sulfide, hydrogen chloride, and methyl mercaptans and a second stage impregnated with an acid removing at least some odors selected from the group of ammonia and amines; and a remote indicator having a visually changing remote display, said remote indicator spaced apart and remotely away from the housing and displaying a state of the filter related to time elapsed since the filter is installed through the visually by changing remote display changing the remote display to show elapsed time directly related to time since installation.

2. A filter comprising:

a housing having a canister, at least one end cap having an inlet therethrough connected to the housing, and an outlet, said housing selectively connectable to a tank having human waste therein in an installed configuration with the canister removing at least some gaseous odors intermediate the inlet and the outlet;

at least three different stages of particulate media located in the canister, with a first stage impregnated with an acid removing at least some odors selected from the group of ammonia and amines, a second stage of a different material than the first and a third stage, and the third stage impregnated with a base removing at least some odors selected from the group of hydrogen sulfide, hydrogen chloride, and methyl mercaptans, wherein the third stage of media impregnated with the base is at least one of a base impregnated activated charcoal and a base impregnated alumina; and a remote indicator having a visually changing remote display, said remote indicator being spaced remotely away from the housing and displaying a state of the filter related to time elapsed since the filter is installed through the visually changing remote display showing elapsed time.

3. The filter of claim 2 further comprising a relief valve connected directly to the first end cap, said relief valve releasing in the event of one of an overpressure and underpressure event at the canister through the housing.

4. The filter of claim 2 further comprising first and second relief valves provided respectively in each of the first and second end caps of the filter intermediate the inlet and the outlet of the housing, with at least one of said first and second relief valves releasing in the event of one of an overpressure and underpressure event at the canister through the housing.

* * * * *